(12) United States Patent
Grotto et al.

(10) Patent No.: US 11,761,516 B2
(45) Date of Patent: Sep. 19, 2023

(54) DEVICE AND METHOD FOR TENSIONING A BELT OF A VIDEO CAMERA ASSEMBLY

(71) Applicant: VIDEOTEC S.p.A., Schio (IT)

(72) Inventors: Alessio Grotto, Schio (IT); Angelo Ribello, Schio (IT)

(73) Assignee: VIDEOTEC S.P.A., Schio (IT)

( * ) Notice: Subject to any disclaimer, the term of this patent is extended or adjusted under 35 U.S.C. 154(b) by 449 days.

(21) Appl. No.: 17/277,458

(22) PCT Filed: Sep. 20, 2019

(86) PCT No.: PCT/IB2019/057968
§ 371 (c)(1),
(2) Date: Mar. 18, 2021

(87) PCT Pub. No.: WO2020/058925
PCT Pub. Date: Mar. 26, 2020

(65) Prior Publication Data
US 2021/0270349 A1    Sep. 2, 2021

(30) Foreign Application Priority Data
Sep. 21, 2018 (IT) .................. 102018000008811

(51) Int. Cl.
*F16H 7/12* (2006.01)
*F16M 11/12* (2006.01)
(Continued)

(52) U.S. Cl.
CPC ......... *F16H 7/1263* (2013.01); *F16M 11/126* (2013.01); *F16M 11/18* (2013.01);
(Continued)

(58) Field of Classification Search
CPC .......... F16H 2007/0806; F16H 7/1263; F16H 2007/0891; F16H 2007/088; F16H 2007/0865; F16M 11/126; F16M 11/18
(Continued)

(56) References Cited

U.S. PATENT DOCUMENTS 1,317,150 A * 9/1919 Allmand et al. ............. 74/89.21
1,374,643 A * 4/1921 Fischbach ............. F16H 7/1263
474/138
(Continued)

FOREIGN PATENT DOCUMENTS

CN 207443022 U 6/2018
JP 2004007261 A 1/2004

OTHER PUBLICATIONS

International Search Report and Written Opinion dated Dec. 4, 2019 in corresponding International application No. PCT/IB2019/057968; 8 pages.

*Primary Examiner* — Henry Y Liu

(57) ABSTRACT

A device for tensioning a belt of a video camera assembly, including a belt tensioner terminal and an elastic thrust element operating on the belt tensioner terminal for thrusting the belt tensioner terminal against the belt. The device further includes an adjustment element for determining an adjustable positioning of the belt tensioner terminal with respect to the belt and at least one constraint element for operating between a rest condition, where it does not constrain the positioning of the belt tensioner terminal, and a constraint condition, where it constrains in position the belt tensioner terminal. The adjustment element is operatively connected to the thrust element in a removable way. Advantageously, the thrust element and the adjustment element share a same operative direction, the at least one constraint element operating or developing along a direction which is
(Continued)

orthogonal to said operative direction of the thrust element and of the adjustment element.

18 Claims, 4 Drawing Sheets

(51) Int. Cl.
  *F16M 11/18* (2006.01)
  *F16H 7/08* (2006.01)
(52) U.S. Cl.
  CPC ........... *F16H 2007/0806* (2013.01); *F16H 2007/088* (2013.01); *F16H 2007/0865* (2013.01); *F16H 2007/0891* (2013.01)
(58) Field of Classification Search
  USPC ........................................................ 474/138
  See application file for complete search history.

(56) References Cited

U.S. PATENT DOCUMENTS

| | | | | |
|---|---|---|---|---|
| 1,673,762 A * | 6/1928 | Chapman | F16H 7/1272 | 474/138 |
| 1,694,652 A * | 12/1928 | Hager | B61C 9/00 | 474/84 |
| 1,783,987 A * | 12/1930 | Thompson | F16H 7/1272 | 474/138 |
| 2,985,027 A * | 5/1961 | Murray | F16H 7/1263 | 474/138 |
| 3,054,299 A * | 9/1962 | Procter | F16H 7/1263 | 474/138 |
| 3,413,866 A * | 12/1968 | Ford | F16H 7/1272 | 474/138 |
| 3,812,733 A * | 5/1974 | Yoshida | F16H 7/0848 | 474/111 |
| 3,978,737 A * | 9/1976 | Bailey | F16H 7/0848 | 474/138 |
| 4,411,638 A * | 10/1983 | Wilson | F16H 7/1236 | 474/138 |
| 4,425,103 A * | 1/1984 | Foster | F16H 7/1236 | 474/138 |
| 4,458,403 A * | 7/1984 | Foster | F16H 7/1236 | 29/434 |
| 4,500,304 A * | 2/1985 | Foster | F16H 7/1236 | 474/138 |
| 4,838,101 A * | 6/1989 | Dobberpuhl | B60K 25/02 | 474/136 |
| 7,824,286 B2 * | 11/2010 | Schmid | F16H 7/1281 | 474/138 |
| 8,216,101 B2 * | 7/2012 | Numajiri | F16H 7/1263 | 474/138 |
| 8,974,334 B2 * | 3/2015 | Stephenson | E06C 7/12 | 182/8 |
| 9,106,818 B2 * | 8/2015 | Lai | H04N 23/50 | |
| 2003/0109343 A1 * | 6/2003 | Martinson | F16H 7/1263 | 474/107 |
| 2005/0187053 A1 * | 8/2005 | Kim | F16H 7/08 | 474/138 |
| 2006/0183586 A1 * | 8/2006 | Hayward | F16H 7/129 | 474/140 |
| 2006/0217223 A1 * | 9/2006 | Schmid | F16H 7/1281 | 474/136 |
| 2011/0120115 A1 * | 5/2011 | Alexander | F02G 5/04 | 60/527 |
| 2011/0269586 A1 * | 11/2011 | Numajiri | F16H 7/1263 | 474/138 |
| 2018/0355954 A1 * | 12/2018 | Kim | F16H 7/12 | |
| 2019/0024763 A1 * | 1/2019 | Lebender | F16H 7/1281 | |

* cited by examiner

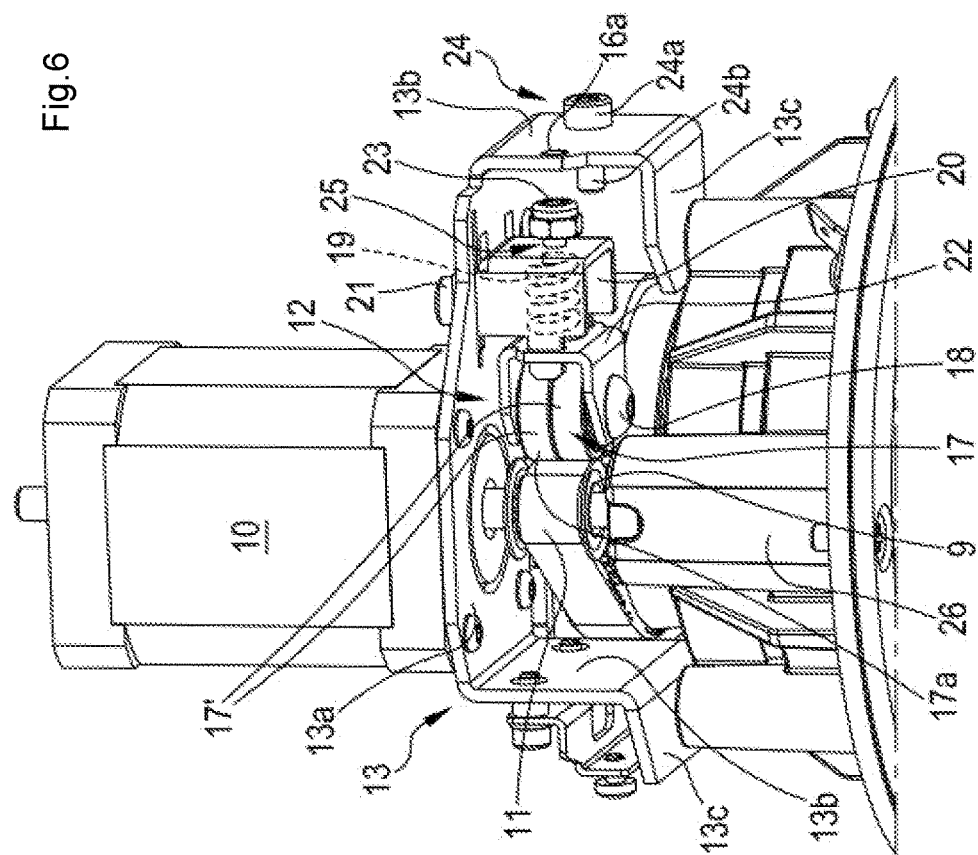
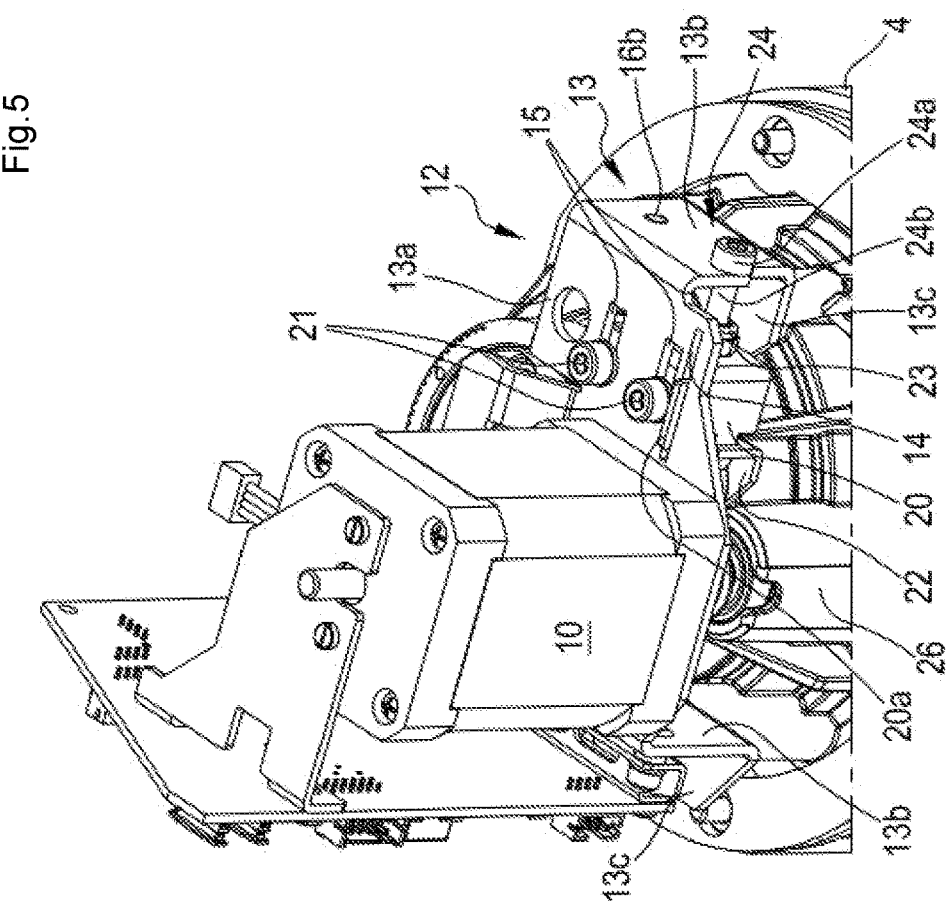

DEVICE AND METHOD FOR TENSIONING A BELT OF A VIDEO CAMERA ASSEMBLY

TECHNICAL FIELD

The present invention relates to the field of video cameras that can be used for example, in the field of video surveillance. The invention particularly relates to a device for tensioning a belt of a video camera assembly and to a method for tensioning a belt of a video camera assembly.

BACKGROUND

Systems are known for tensioning a belt of a video camera assembly.

A tensioning system of a belt of a video camera assembly is provided by Chinese utility model CN207443022U. CN207443022U relates to a device for adjusting an orientation angle of a video camera comprising a belt placed in rotation by a drive pulley and coupled to an idle pulley associated with the video camera. The belt is kept tight by a belt tensioning system that provides two belt tensioner pulleys. The tensioning system also provides for a belt tensioner pulley to be associated with an automatic tensioning mechanism based on a pulley and a compression spring. The spring has one end associated with a fixed element and an opposite end associated with the end of a cable of the pulley, while the fulcrum of the belt tensioner pulley is coupled to the opposite end of the cable.

The belt tensioning system in Chinese utility model CN207443022U describes that the spring allows keeping the belt tensioned during the operation thereof. However, such belt tensioning system does not allow applying a tension of an accurate entity on the belt because the burden of tensioning the belt is completely transferred to the spring.

In addition to the above, once assembled, the belt tensioning system of Chinese utility model CN207443022U has a rigid structure that cannot be modified. The only member to which an automatic modification of the system is transferred is the spring, which elasticity however cannot deal with all the possible slackening cases and entities of the belt. For example, should the belt slacken significantly, the elasticity of the spring might not be sufficient to adequately tension the belt; in this case, the pressure, and therefore the friction of the belt on the pulleys, would be reduced, and therefore frequent slipping of the belt on the pulleys would occur, which affects the transmission of the motion by the belt, thus compromising the functionality of the whole motion transmission system.

Moreover, the belt tensioning system of Chinese utility model CN207443022U is cumbersome and complicated to implement in a video camera assembly.

Another belt tensioning system is known from American Patent U.S. Pat. No. 9,106,818B2. It describes a display comprising a movable video camera. The display comprises a motion transmission system for rotating the video camera in tilt direction. Such system comprises a belt tightened between two pulleys. Moreover, a belt tensioner assembly is provided that provides a tension arm, which is slidingly coupled to a support fastened to an inner wall of the display and protruding towards the belt. A spring is also provided, which is inserted between the tension arm and the support so as to thrust the tension arm towards the belt.

However, also the belt tensioning system in American Patent U.S. Pat. No. 9,106,818B2 has drawbacks. For example, such belt tensioning system does not allow applying a tension of a precise magnitude on the belt because the burden of tensioning the belt is completely transferred to the spring.

Moreover, once assembled, the belt tensioner assembly described above cannot be modified to deal with possible significant slackening of the belt, with the exception of the automatic modification of the operating conditions of the belt tensioner assembly completely based on the elasticity of the spring. In essence, the burden of tensioning the belt is completely transferred to the spring which however as mentioned above, cannot deal with all the possible cases and magnitudes of the slackening of the belt. Accordingly, the belt tensioning assembly in American Patent U.S. Pat. No. 9,106,818B2 is not suitable for dealing with a significant slackening of the belt in an optimal way.

In light of the above, it is possible to affirm that the known systems for tensioning a belt of a video camera assembly do not allow applying an accurate tension on the belt, since the burden of tensioning the belt is completely transferred to the spring.

The known systems for tensioning a belt of a video camera assembly therefore do not allow keeping optimal tension conditions during the life of the belt for the operation of the belt itself and accordingly of the whole video camera assembly.

SUMMARY

The object of the present invention is to overcome the drawbacks of the prior art.

The object of the present invention in particular is to introduce a device for tensioning a belt of a video camera assembly that ensures an accurate and reliable tensioning of the belt.

The object of the present invention is also to provide a device for tensioning a belt of a video camera assembly that allows adjusting the tension of the belt, for example should the belt become slack, in a simple and accurate way.

The object of the present invention is also to introduce a video camera assembly that allows tensioning the belt in an accurate, reliable and adjustable way both during the assembly step of the video camera assembly and in an adjustment phase of the tensioning of the video camera, which may become necessary due to a slackening of the belt subsequent to the use thereof.

Moreover, a further object of the present invention is to introduce a video camera assembly that allows the accurate and reliable adjustment of the tension of the belt.

Moreover, a further object of the present invention is to introduce a method for tensioning a belt of a video camera assembly that allows adjusting the tension of a belt in a simple and reliable way.

It is also an object of the present invention to avoid replacing the belt or a complex maintenance operation should the belt become slack.

These and other objects of the present invention are achieved by means of a device for tensioning a belt of a video camera assembly, a video camera assembly and a method for tensioning a belt of a video camera assembly incorporating the features of the appended claims, which form an integral part of the present description. Moreover, the invention may be in agreement with the technical features hereinbelow described, which may be considered individually or in any combination thereof.

In one embodiment, a device for tensioning a belt of a video camera assembly is provided. The device comprises a belt tensioner terminal configured for operating in contact with the belt to tension the belt. The device further comprises a thrust element operating on the belt tensioner terminal for thrusting the belt tensioner terminal against the belt. Preferably, the thrust element is of elastic type. The device further comprises an adjustment element configured for determining an adjustable positioning of the belt tensioner terminal with respect to the belt. The device further comprises at least one constraint element configured for operating between a rest condition, wherein it does not constrain the positioning of the belt tensioner terminal, and a constraint condition, wherein it constrains the belt tensioner terminal in position. Preferably, the adjustment element is configured for being operatively connected to the thrust element in a removable way. The thrust element and the adjustment element share a same operative direction, said at least one constraint element operating or developing along a direction which is orthogonal to said operative direction of the thrust element and of the adjustment element.

Thanks to such technical solution, the device allows making adjustments of the belt tension. In essence, the device is flexible to the tensioning needs of the belt and to the changing thereof over time. The device therefore is flexible (not rigid) in the sense that it allows modifying the tension of the belt over time, also after a first tightening of the constraint elements, that may be tightened or released a plurality of times according to the tensioning needs of the belt. Moreover, providing such orthogonal or substantially orthogonal operative directions allows providing an optimal and compact operative configuration. In essence, such technical solution allows providing a compact device that may be housed in the limited spaces available in the box-like body of a video camera assembly.

Advantageously, being able to adjust the tension of the belt avoids the replacement thereof when it becomes slack. In essence, if the belt slackens slightly, it does not need to be replaced, rather the thrust element is able to deal with a slight slackening of the belt by thrusting the belt tensioner terminal against the belt by means of its elastic force. Otherwise, if the belt is significantly slackened it does not require to be replaced rather the belt is tensioned by means of the device.

Moreover, by allowing the tensioning of the belt to be carried out in a simple way, the above technical solution makes adjusting the tension of the belt possible also by a user of the video camera assembly. In this way, bringing back the video camera assembly for servicing is advantageously avoided, thus decreasing the stop times of the video camera assembly (time in which the video camera assembly is not operative) in the case the belt requires tensioning.

Summarizing, should the belt slacken, it may be pulled tight again in a simple way by activating the adjustment element; therefore it is not necessary to replace the belt or to recall the video camera assembly back for servicing once the belt slackens.

A further advantage is the fact that by being able to disengage the adjustment element in a removable way, the adjustment element may be placed or stored together with the device itself. For example, it may be placed in a convenient seat made in a frame of the device or in a box-like body of a video camera assembly so as to have the adjustment element ready for use, when needed.

The device advantageously allows adjusting the tension of the belt both in the initial assembly step of the video camera assembly and in a successive step, for example in the case there is a need to tension the belt again because it has become slack over time, following the operation thereof.

Therefore, the device allows both an accurate initial determination of the tension of the belt in assembly step of the video camera assembly and an accurate following adjustment of the tension of the belt that may be required due to a slackening of the belt, for example.

In one embodiment, the device further comprises a body housing the thrust element. A movement of the body adjusts the thrust by which the belt tensioner terminal thrusts on the belt. The adjustment element is configured for moving the body so as to adjust a thrust intensity that the belt tensioner terminal exerts on the belt. The constraint element is engaged to the body. The constraint element allows the movement of the body in the rest condition and determines a stable positioning of the body in the constraint condition, thus preventing the movement of the body.

Advantageously, providing a body that houses the thrust element gives the device a sturdy structure and also allows protecting the thrust element.

Moreover, a further advantage of such solution is that the body allows the adjustment element to operate on the thrust element in a simple and effective way.

Thanks to such technical solution, the thrust element is engaged, i.e. it exerts its elastic thrust in order to adjust the position of the belt tensioner terminal with respect to the belt, only when the adjustment element is operatively disconnected from the thrust element.

In one embodiment, the device further comprises a frame. The constraint element is engaged to the frame. The constraint element allows the movement of the body with respect to the frame in the rest condition and therefore does not constrain a positioning of the thrust element. The constraint element fastens the body in position with respect to the frame in the constraint condition and therefore determines a stable positioning of the thrust element.

The frame advantageously gives the device a sturdy structure and allows the device to be at least partially structurally supported.

Advantageously, providing a frame also allows the engagement of the constraint element and allows the constraint of the body by means of the constraint element.

In one embodiment, the frame has at least one guide for said at least one constraint element. The guide is configured for allowing a movement of the constraint element in the rest condition of said at least one constraint element. The constraint element is at least partially housed at the guide.

Advantageously, the guide provides an abutment along which the constraint element, which is integral with the body also in the rest condition, may slide during the adjustment by the adjustment element.

In one embodiment, the frame has a portion developing frontally with respect to the body. The portion has at least one seat. The adjustment element is housed at the seat in operating conditions (or adjustment conditions). Optionally, the seat comprises a through hole that is substantially coaxial with respect to an operative direction of the adjustment element. The portion optionally comprises a side wall of the frame.

Advantageously, the seat serves as abutment that allows directing the adjustment element with respect to the body to properly operate on the body. Moreover, the seat serves as support for the adjustment element.

In one embodiment, the device further comprises an adjustment portion engaged to the body. The thrust element is engaged to the adjustment portion. The adjustment element is configured for being engaged to the adjustment portion in a removable way for operating on the thrust element. The thrust element is configured for forming a gap between the adjustment portion and the body by partial elastic springback of the thrust element following the disengagement of the adjustment element from the adjustment portion. The gap preferably is defined between facing surfaces of the adjustment portion and of the body.

Advantageously, the gap allows dealing with—for example by absorbing and/or damping—strains or stresses that the belt transmits to the device in operating conditions. In particular, the gap provides a clearance adapted to determine an automatic adjustment of the thrust of the thrust element on the belt tensioner terminal and therefore allows substantially keeping constant the tension of the belt in the face of a possible relaxation of the belt itself.

In one embodiment, the seat is arranged coaxial with the adjustment portion and is configured for cooperating with the adjustment element to direct it towards the adjustment portion.

In this manner, it is possible to guide the adjustment element in a very simple manner, without the need for particular tools.

In one embodiment, the adjustment element comprises a stem configured for entering into contact with the adjustment portion. Moreover, the seat is adapted to receive the stem in a through way and to serve as support for the stem of the adjustment element.

In this manner, it is possible to guide a configuration element with elongated shape into contact with the adjustment portion in a simple and reliable way.

Preferably, the adjustment element also comprises an operative portion having an overall dimension in section which is greater than a free passage area of the seat so as to enter into contact with the portion of the frame, in a condition of maximum penetration of the adjustment element into the seat.

Thanks to this solution, it is possible to define a maximum tension allowed for the device for tensioning a belt.

The adjustment element comprises one among a bolt, a screw and a nail.

In other words, the adjustment element may be obtained by means of a mechanical element that is particularly simple to make and use.

In one embodiment, the belt tensioner terminal comprises at least one rotation support element, such as a ball bearing. The belt tensioner terminal preferably comprises two rotation support elements, for example two ball bearings.

Providing a rotation support element at the belt tensioner terminal allows the belt to operate in an optimal way, allowing for example an optimal rotation of the components that the belt drags in rotation.

In one embodiment, the frame has a portion arranged frontally with respect to the body. The portion has at least one seat. The adjustment element is housed at said seat in the rest condition. Optionally, the seat is a through seat. The portion optionally comprises a side wall of the frame.

Providing a seat for the adjustment element in the frame allows the adjustment element to be put back, when not in use. This allows having the adjustment element ready for use, when needed. The belt tensioning operation is speeded up and simplified in this way.

In one embodiment, the body has a portion that slides with respect to the frame. The frame has a guide and the sliding portion is configured for translating, with respect to the frame, at the guide.

The guide advantageously allows accurately directing the translation of the body, with respect to the frame, close to and away from the belt.

In one embodiment, the belt tensioner terminal has a contact surface or thrust surface.

In one embodiment, the contact surface or thrust surface substantially is a pressure surface configured for operating in contact with the belt to exert a given pressure on the belt so as to tension the belt.

In one embodiment, in a condition wherein the adjustment element is operatively disconnected from the thrust element, the thrust element is configured for dealing with possible slackening of the belt by means of its elastic force.

Advantageously, the thrust element allows automatically adjusting, by means of its elastic force, the tension of the belt in the case of the slight slackening of the belt.

In one embodiment, in a condition wherein the adjustment element is operatively disconnected from the thrust element, the thrust element is configured for recovering a clearance due to a slackening of the belt.

Advantageously, by recovering the clearance due to a slackening of the belt, the thrust element automatically adjusts the tension of the belt in the case of slight slackening of the belt.

In one embodiment, the adjustment element is configured for operating between an adjustment condition, wherein it is operatively connected to the thrust element and operates to make adjustments thereon, and a rest condition, wherein it is not operatively connected to the thrust element.

In one embodiment, the belt tensioner terminal is integral in translation with the body.

In one embodiment, the belt tensioner terminal is configured for rotating.

In one embodiment, the belt is configured for putting the belt tensioner terminal into rotation.

In one embodiment, elastic thrust element means a thrust element capable of elastically reacting to the stresses it undergoes.

In one embodiment, elastic thrust element means an elastically deformable thrust element.

A different aspect of the present invention relates to a use of the device for tensioning a belt of a video camera assembly in the field of assembling a video camera assembly, for example.

A different aspect of the present invention relates to a use of the device for adjusting the tensioning of a belt of a video camera assembly following a slackening of the belt, for example.

A different aspect of the present invention relates to a video camera assembly comprising a video camera housing body, a video camera housed in the video camera housing body, a motor and a belt coupled to the motor and configured for transferring rotary motion. The video camera assembly further comprises a device for tensioning the belt according to that described above and/or to any one of the appended claims.

Advantageously, the video camera assembly provided with a compact device for tensioning the belt allows adjusting the belt without making use of complex dedicated tools, using an adjustment element. The video camera assembly may be provided equipped for example, with the adjustment element to simplify and speed up the tension of the belt adjustment operations for a user.

The video camera assembly advantageously allows adjusting the tension of the belt both in the initial assembly step of the video camera assembly and in a successive step, for example in the case there is a need to tension the belt again because it has become slack following the operation of the video camera assembly. In this way, the video camera assembly allows both an accurate initial determination of the tension of the belt in assembly step of the video camera assembly and a following adjustment of the tension of the belt that may be required for example, following a slackening of the belt.

Advantageously, the video camera assembly automatically adjusts the tension of the belt in the case of slight slackening of the belt by means of the thrust element which, by means of its elastic force, allows automatically adjusting the tension of the belt in the case of slight slackening of the belt.

The video camera assembly is less subject to maintenance operations or assistance which, should they become necessary, are more quick and simpler due to the possibility of adjusting the tension of the belt by simply operating by means of the adjustment element. Moreover, maintenance operations or assistance might not be necessary due to the possibility that it directly is a user of the video camera assembly to tension the belt.

In one embodiment, the assembly further comprises a box-like body housing the device. The video camera housing body is rotatably engaged to a first portion of the box-like body. The belt is a power transmission belt configured for allowing a rotation of the first portion of the box-like body and of the video camera housing body with respect to a second portion of the box-like body in at least an operating condition of the video camera assembly.

Advantageously, providing an assembly provided with a device for tensioning the belt configured for allowing a rotation of the video camera housing body with respect to the box-like body allows keeping an optimal tension of the belt over time, which causes the video camera to rotate with respect to the box-like body. An optimal tension of such belt allows an accurate movement and positioning of the video camera and therefore, optimizes the operating conditions and the reliability of the video camera assembly over time.

A different aspect of the present invention relates to a use of the video camera assembly in the field of video surveillance of environments.

A different aspect of the present invention relates to a method for tensioning a belt of a video camera assembly comprising at least the steps of providing a belt of a video camera assembly according to one of the embodiments described above; thrusting, by means of a thrust element of elastic type, a belt tensioner terminal against the belt for tensioning the belt; adjusting a thrust intensity that the belt tensioner terminal exerts on the belt by means of an adjustment element; constraining the belt tensioner terminal in a desired position by means of a constraint element operating or developing along a direction that is orthogonal to said operative direction of the thrust element and of the adjustment element, the desired position of the belt tensioner terminal corresponding to a desired tension of the belt; operatively disconnecting the adjustment element from the thrust element.

According to the method described, the tensioning of the belt advantageously may be performed in a simple, quick and efficient way. Moreover, the tension of the belt may be adjusted one or more times also following the initial calibration of the system.

Another advantage of the method is the fact that it allows adjusting the tension of the belt both in the initial assembly step of the video camera assembly and in a successive step, for example in the case there is a need to tension the belt again because it has become slack following the operation thereof. In this way, the method allows both an accurate initial determination of the tension of the belt in assembly step of the video camera assembly and a following adjustment of the tension of the belt that may be required for example, following a slackening of the belt.

A further advantage consists in the fact that should the belt slacken, it may be pulled tight again; therefore it is not necessary to replace the belt or to bring the video camera assembly back for servicing once the belt slackens.

Due to the simplicity of the tension adjustment method of the belt, the method may be implemented in an easy and quick way also by a user of the video camera assembly. This avoids maintenance operations by dedicated operators on the video camera assembly.

Advantageously, by being able to disengage the adjustment element in a removable way, it may be placed in a convenient seat of a box-like body of a video camera assembly, or in the box-like body thereof, so as to have the adjustment element ready for use, when needed.

In one embodiment, adjusting a thrust intensity that the belt tensioner terminal exerts on the belt comprises moving the belt tensioner terminal and moving a body housing the thrust element.

Advantageously, the body allows supporting and protecting the thrust element.

The body also allows the adjustment element to operate on the thrust element in a simple and effective way.

In one embodiment, constraining the belt tensioner terminal in a desired position comprises constraining a position of the thrust element and/or of the body, for example with respect to a frame.

Advantageously, constraining the position of the thrust element prevents a free deformation thereof and allows a desired positioning of the thrust element and of the body, for example with respect to the frame. Moreover, the position of the thrust element following a partial elastic springback of the elastic element, is stable.

Constraining the position of the body also determines a constraint on the position of the thrust element.

In one embodiment, the method further comprises a step of releasing the belt tensioner terminal in order to allow an adjustment of the tension of the belt.

Advantageously by releasing the belt tensioner terminal, the method allows both an adjustment of the tension of the belt that may be required for example, following a slackening of the belt.

In one embodiment, adjusting a thrust intensity that the belt tensioner terminal exerts on the belt comprises operating with the adjustment element at an adjustment portion; operatively disconnecting the adjustment element from the thrust element comprises disengaging the adjustment element from the adjustment portion. The method further comprises a step of forming a gap between the adjustment portion and a body housing the thrust element by partial elastic springback of the thrust element. The step of forming the gap is successive to the step of disengagement of the adjustment element from the adjustment portion.

Advantageously, the gap allows dealing with—for example by absorbing and/or damping—strains or stresses that the belt transmits to the device in operating conditions.

In one embodiment, the step of forming the gap comprises automatically forming the gap. Preferably, the automatic formation of the gap is subsequent to the disengagement step of the adjustment element from the adjustment portion.

Advantageously, the formation of the gap is an automatic step, in the sense that it cannot be set; it is due to the elastic force of the thrust element and is subsequent to the disengagement of the adjustment element from the adjustment portion. In essence, by disengaging the adjustment element from the adjustment portion, the thrust element may be deformed and is subject to a partial elastic springback that automatically determines the formation of the gap.

In one embodiment, providing a belt of a video camera assembly comprises providing a video camera assembly.

In one embodiment, providing a belt of a video camera assembly comprises providing a video camera assembly comprising a device for tensioning a belt of a video camera assembly.

In one embodiment, the method further comprises a step of providing a device for tensioning a belt of a video camera assembly.

In one embodiment, the method comprises a step of placing a belt tensioner terminal in contact with the belt, preferably at a contact surface of the belt tensioner terminal.

In one embodiment, the step of releasing the belt tensioner terminal in order to allow an adjustment of the belt tension is performed following the step of providing the belt and prior to the step of a thrust element thrusting a belt tensioner terminal against the belt.

A different aspect of the present invention relates to a method for adjusting the belt tensioning of a video camera assembly comprising the steps of disengaging the constraint elements, adjusting the tension of the belt by means of the adjustment element, engaging the constraint elements again.

Further features and objects of the present invention shall be more apparent from the following description.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate.

FIG. 5 depicts a device for tensioning a belt of a video camera assembly within the scope of steps of a method for tensioning a belt of a video camera assembly; both the device and the method herein illustrated are according to an embodiment of the present invention.

FIG. 6 depicts a device for tensioning a belt of a video camera assembly within the scope of steps of a method for tensioning a belt of a video camera assembly; both the device and the method herein illustrated are according to an embodiment of the present invention.

DETAILED DESCRIPTION OF THE EMBODIMENTS

Figure 1:
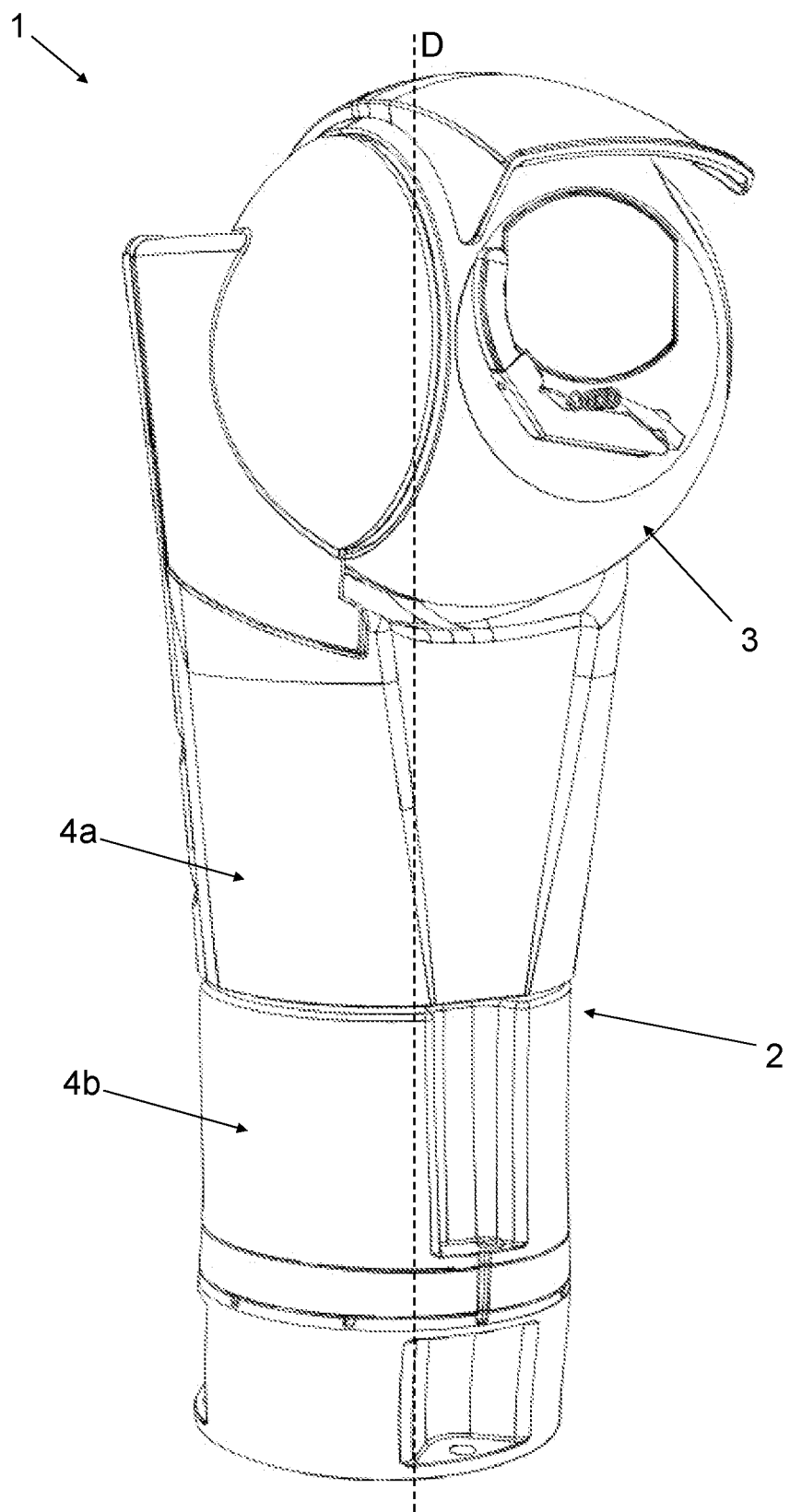
FIG. 1 is an isometric view of the video camera assembly according to an embodiment of the present invention.

While the invention is susceptible to various modifications and alternative constructions, certain preferred embodiments are shown in the drawings and are described hereinbelow in detail. It is in any case to be noted that there is no intention to limit the invention to the specific embodiment illustrated rather on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "includes" or "comprises" means respectively "includes, but not limited to", and "comprises, but not limited to", unless otherwise indicated.

The use of terms such as "upper", "at the top", "bottom", "at the bottom", "side", "at the side", "horizontal", "horizontally", "vertical", "vertically", "front", "frontally", "rear", "at the rear" and the like, refers to the spatial orientation that the device for tensioning a belt of a video camera assembly and the video camera assembly according to the present invention normally take on in operating conditions or conditions of use. A possible spatial orientation that the video camera assembly according to the present invention may take on in operating conditions is illustrated by way of example in FIGS. 1 and 2, and a possible spatial orientation that the device for tensioning a belt of a video camera assembly according to the present invention may take on in operating conditions is illustrated by way of example in FIGS. 3 and 6.

Figure 2:
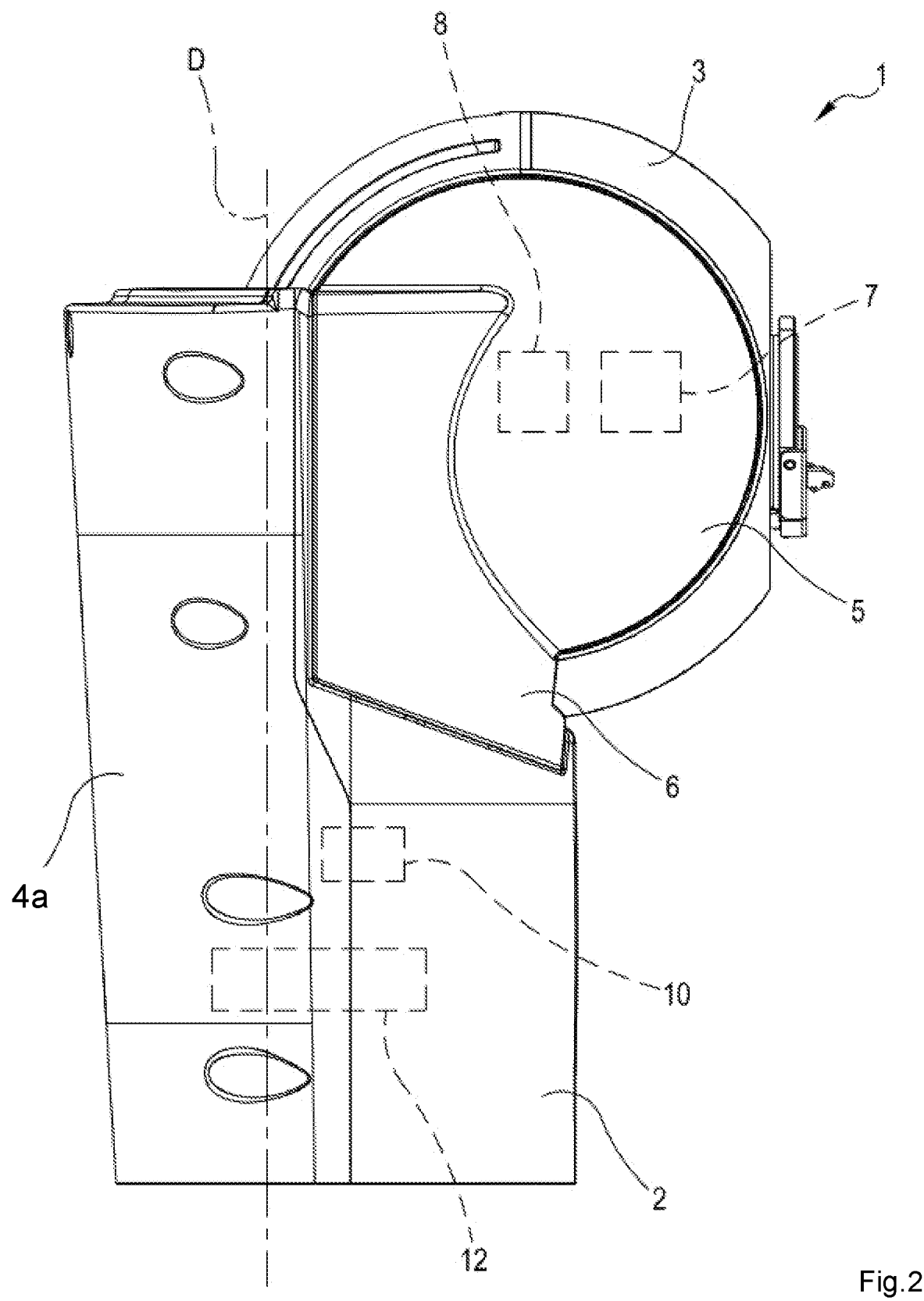
FIG. 2 is a side view of the video camera assembly according to an embodiment of the present invention.

FIGS. 1 and 2 are a view of a video camera assembly 1 according to an embodiment of the present invention. The video camera assembly 1 comprises a box-like body 2 and a video camera housing body 3. The video camera housing body 3 is rotatably engaged to the box-like body 2.

As illustrated in FIGS. 1 and 2, the box-like body 2 has a portion 4 with elongated shape developing along a main direction D. In operating conditions of the video camera assembly 1, the portion 4a with elongated shape is engaged to a portion of base 4b of the box-like body 2, which may be used for connecting or constraining the video camera assembly 1 to a support structure, such as a pole. An example of operating conditions of the video camera assembly 1 entails the use of the video camera assembly 1 in the field of the video surveillance of environments.

The box-like body 2 has a portion 5 defining a cavity at an end of the portion 4a with elongated shape. As shown in FIG. 2, the portion 5 defining a cavity may develop at an upper end of the portion 4a with elongated shape.

The portion 5 defining a cavity preferably has a substantially spherical-cap shape, defining a convexity. It is understood that the portion 5 defining a cavity may have a preferably convex shape, alternative to the spherical-cap shape, for example a parallelepiped shape or an alternative solid of revolution shape, such as a conical or frustoconical shape, or any other shape adapted to define a cavity therein.

Solid of revolution within the context of the present description means a solid provided with symmetry of revolution.

A shaft (not illustrated in the accompanying drawings) developing along a direction defining a rotation axis may be housed at the cavity defined by the portion 5. The shaft is configured for causing the video camera housing body 3 to rotate with respect to the box-like body 2 and to the portion 5. The video camera housing body 3 is integral in rotation with the shaft.

Further members configured for allowing the rotation of the video camera housing body 3 such as bearings, a pulley, etc., may also be housed in the portion 5.

As illustrated in FIG. 2, the box-like body 2 has a guide portion 6 at the same end as the portion 4a with elongated shape in which the portion 5 defining a cavity develops. The guide portion 6 is structured to house the video camera housing body 3.

The guide portion 6 houses the video camera housing body 3 and has a shape adapted to allow the rotation of the video camera housing body 3 with respect to the box-like body 2.

Preferably, the guide portion 6 has a shape that is at least partially complementary to the video camera housing body 3. Advantageously, such shape of the guide portion 6 allows the rotation of the video camera housing body 3 with respect to the box-like body 2. The guide portion 6 may have an at least partially spherical shape defining a concavity. It is understood that other concave shapes of the guide portion 6 may be possible, such as for example a conical or frusto-conical shape or similar solid of revolution shapes adapted to allow the rotation of the video camera housing body 3 with respect to the box-like body 2.

The video camera housing body 3 preferably is housed at the guide portion 6 without contact with the guide portion 6. The absence of contact between the video camera housing body 3 and guide portion 6 advantageously allows a free rotation of the video camera housing body 3 with respect to the box-like body 2.

Similarly to that described above with reference to the guide portion 6, the video camera housing body 3 preferably has a shape that is at least partially complementary with respect to the guide portion 6. Advantageously, such shape of the video camera housing body 3 allows the rotation thereof with respect to the box-like body 2. The video camera housing body 3 preferably has a shape that is at least partially spherical defining a convexity intended to be housed without contact at the concavity defined by the guide portion 6. The video camera housing body 3 preferably has a substantially spherical-cap shape. It is understood that other convex shapes of the video camera housing body 3 may be possible, such as for example a conical or frusto-conical shape or similar solid of revolution shapes adapted to allow the rotation of the video camera housing body 3 with respect to the box-like body 2.

As schematically illustrated in FIG. 2, the video camera assembly 1 further comprises a video camera 7 and a swivel system 8 (schematically illustrated in the accompanying drawings) configured for allowing a rotation of the video camera 7 along a vertical axis (pan movement) and a rotation of the video camera along a horizontal axis (tilt movement). The vertical axis about which the video camera 7 may rotate in operating conditions of the video camera assembly 1 substantially is parallel to the main development direction D of the portion 4a with elongated shape. The video camera 7 is arranged in the video camera housing body 3 and the swivel system 8 is arranged at least partially in the box-like body 2. Preferably, a main portion of the swivel system 8 is housed in the box-like body 2 and a portion protrudes towards the video camera housing body 3.

The video camera assembly 1 further comprises a pulley 9, a motor 10 and a belt 11. The motor 10, the pulley 9 and the belt 11 are housed in the portion 4a with elongated shape. The motor 10 may be for example, an electric motor. The pulley 9 is engaged to the motor 10; in operating conditions, the motor 10 transfers rotary motion to the pulley 9 (direct transmission). The belt 11 is configured for transmitting the rotary motion to a further pulley (not shown) that puts the portion 4a with elongated shape of the video camera assembly 1 into rotation about the main development direction D (pan rotation) with respect to the base portion 4b of the box-like body 2 adapted to be fastened to a support element (not illustrated, for example a pole). In addition, the motor 10 may also be used for allowing the rotation of the video camera housing body 3 with respect to the box-like body 2 and to the portion 5 (tilt rotation), transmitting the motion with a convenient drive system (not illustrated in detail in the drawings) possibly coupled to the belt 11.

The video camera assembly 1 further comprises a housing portion 26 of an end of the shaft. The housing portion 26 of an end of the shaft further comprises a ball bearing (not illustrated in the accompanying drawings) housing the end of the shaft. The housing portion 26 of an end of the shaft is configured for rotatably housing, by means of the ball bearing, an end of the shaft in order to prevent the end of the shaft from bending significantly. The housing portion 26 of an end of the shaft is also intended to prevent the shaft from being subject to fatigue phenomena due to the thrust of the belt on the shaft itself. As illustrated in FIGS. 3 to 6, the housing portion 26 of an end of the shaft is arranged vertically and is positioned below the motor 10.

The belt 11 is engaged to the pulley 9 with a given pressure. A convenient pressure of the belt 11 on the pulley 9 determines an optimal transmission of the rotary motion and avoids undesired slipping between belt 11 and pulley 9. The pressure with which the belt 11 is in contact with the pulley 9 is determined by the tension of the belt 11.

The video camera assembly 1 may also comprise the electronic components necessary to control, manage and optimize the operation of the video camera assembly, for example in terms of managing and optimizing the orientation of the video camera 7, of the swivel system 8 and of managing and controlling the operation of the motor 10. The electronic components may be partly housed in the box-like body 2, for example at the portion 4a with elongated shape, and partly in the video camera housing body 3.

The video camera assembly 1 may also comprise convenient cabled or wireless connections necessary for allowing it to operate within a video surveillance system.

According to the present invention, the assembly 1 further provides a device 12 for tensioning the belt 11. The device 12 for tensioning the belt preferably is arranged in the box-like body 2. In the embodiment shown in the accompanying drawings, the device 12 is housed in the box-like body 2 at the portion 4a with elongated shape (see for example FIG. 2).

A frame 13 is also provided, which may be considered as part of the video camera assembly 1 or of the device 12 itself. In the embodiment shown in the accompanying drawings, the frame 13 has an upper wall 13a, two substantially parallel side walls 13b that projects in mutual opposition, and a lower wall 13c.

The frame 13 has at least one guide 14, 15 configured for allowing a movement, in particular a translation, of components of the device 12 with respect to the frame 13; as shown in greater detail below, the translation of components of the device 12 with respect to the frame 13 determines the tensioning of the belt 11. FIG. 5 illustrates a frame 13 having three guides 14, 15 arranged at the upper wall 13a; however it is understood how there may be any number of guides 14, 15 and that the guide(s) 14, 15 may be arranged at any wall 13a, 13b, 13c of the frame 13, such as a lower wall 13c, a side wall 13b, a front wall, a rear wall, etc.

The frame 13 may also have at least one seat 16. In the embodiment shown in the accompanying drawings, two adjacent through holes 16 made at a same side wall 13b of the frame 13 are provided as seats; however it is understood how there may be any number of seats 16 and that the seat(s) 16 may be arranged at any wall 13a, 13b, 13c of the frame 13, such as an upper wall 13a, a lower wall 13c, a front wall, a rear wall, etc. The through holes 16 preferably are threaded.

The device 12 for tensioning the belt 11 comprises a belt tensioner terminal 17, which operates in contact with the belt 11 at a contact surface. In assembled conditions of the video camera assembly 1, the contact surface of the belt tensioner terminal 17 exerts a given pressure on the belt 11 in order to pull tight the belt 11. The belt tensioner terminal 17 may comprise a rotation support element 17, such as a bearing. The rotation support element 17' is configured for rotating about its own pin 18 and preferably is of the rolling type (rolling bearing). In the embodiment shown in the accompanying drawings, the belt tensioner terminal comprises a pair of ball bearings 17'. It is understood that the belt tensioner terminal 17 in alternative embodiments may consists of another element, such as for example an idler pulley or an idle shaft or a roller or a roller bearing or a wheel.

The device 12 further comprises a thrust element 19. The thrust element 19 operates on the belt tensioner terminal 17 for thrusting the belt tensioner terminal 17 against the belt 11. As shown in greater detail below, the thrust element 19 determines an adjustable positioning of the belt tensioner terminal 17 with respect to the belt 11. This allows modulating the tension to which the belt 11 is subject. The thrust element 19 may thrust the belt tensioner terminal 17 against the belt with an adjustable thrust. The thrust is adjustable based on a length of the thrust element 19. In tension adjustment step of the belt 11, the thrust element 19 determines a movement of the belt tensioner terminal 17. The thrust element 19 is structured for operating on the belt tensioner terminal 17 to thrust it, in tension adjustment step of the belt 11, by a distance necessary to pull tight the belt 11 in a desired way. The device 12 comprises a guide element 27 (see FIG. 3) in order to guide the thrust element 19. The guide element 27 is configured for guiding the thrust element 19, which is engaged to the guide element 27. The guide element 27 preferably has an elongated shape and extends along a main development direction. The embodiment shown in the accompanying drawings illustrates a guide element in the shape of a peg 27 about which the thrust element 19 is engaged. It is understood that an alternative guide element 27 may be provided with respect to a pin and adapted to guide the thrust element 19. The thrust element 19 preferably is of elastic type. Within the context of the present description, elastic thrust element 19 means a thrust element 19 capable of elastically reacting to stresses it undergoes. The elastic thrust element 19 preferably is elastically deformable. The embodiment shown in the accompanying drawings illustrates a thrust element in the shape of a spring 19; the peg 27 is arranged in coils of the spring 19. It is understood that alternative thrust elements 19 with respect to a spring may be provided, such as a gripper or a clip that may be conveniently opened wide in adjustable and/or elastic way or an elastic spacer or elastically deformable materials.

The device 12 further comprises a body 20 housing the thrust element 19. As illustrated in the accompanying drawings, the body 20 may be at least partially hollow in order to house the thrust element 19. As illustrated in FIGS. 3 to 6, the body may be in the form of a bracket 20. In alternative embodiments not illustrated in the accompanying drawings, the body 20 may have any shape, different from that of a bracket, adapted to at least partially house the thrust element 19. The body 20 is configured for being moved, preferably in translation, with respect to the frame 13. A body 20 is depicted in the accompanying drawings that may be moved in translation with respect to the frame 13. The body 20 may further comprise a sliding portion 20a, which sliding is guided by the frame 13 itself. As illustrated in FIG. 5, the sliding portion 20a of the body 20 may translate with respect to the frame 13 along a guide 14 opportunely provided in an upper wall 13a of the frame 13. The guide 14 for the sliding portion 20a of the body 20 allows opportunely directing the body 20 in the translation close to or far from the belt 11.

Figure 4:
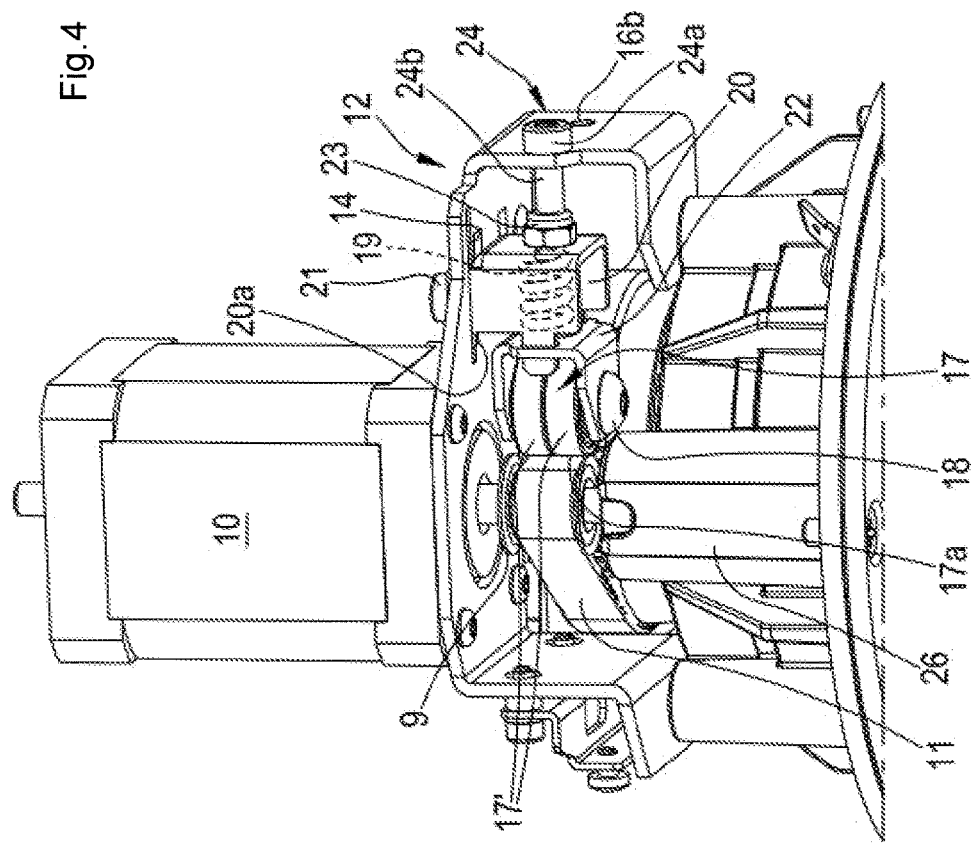
FIG. 4 depicts a device for tensioning a belt of a video camera assembly within the scope of steps of a method for tensioning a belt of a video camera assembly; both the device and the method herein illustrated are according to an embodiment of the present invention.
Figure 3:
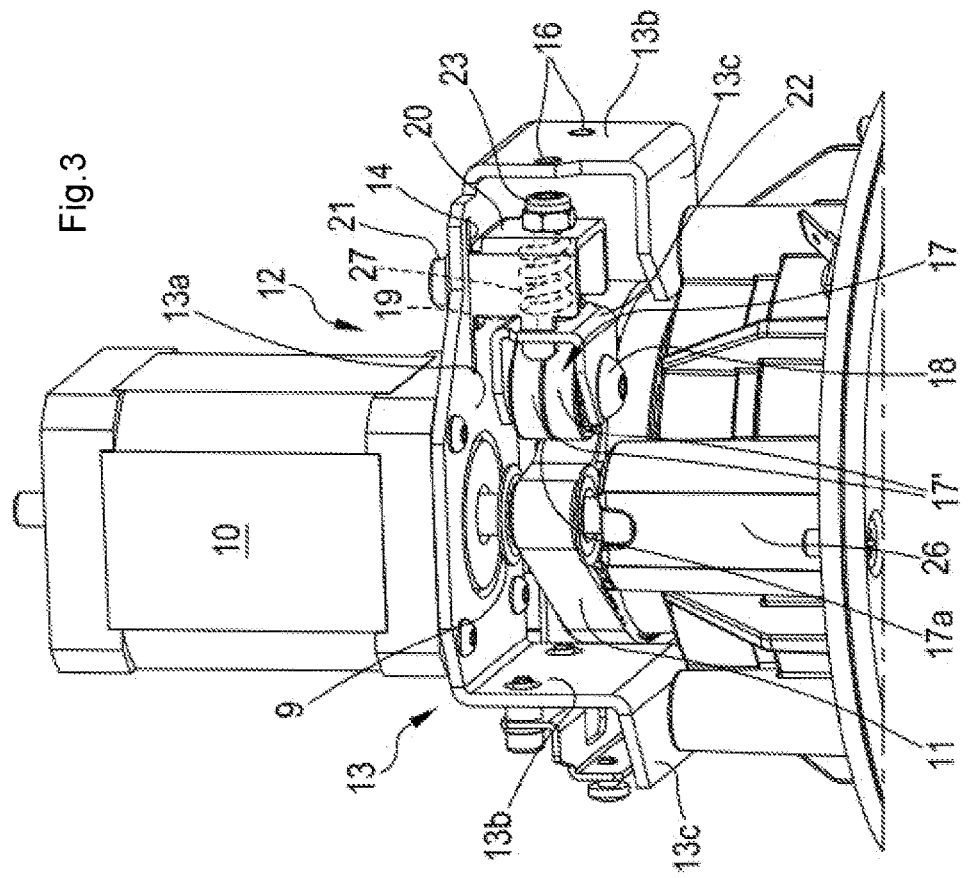
FIG. 3 depicts a device for tensioning a belt of a video camera assembly within the scope of steps of a method for tensioning a belt of a video camera assembly; both the device and the method herein illustrated are according to an embodiment of the present invention.

At least one constraint element 21 is provided to selectively allow or prevent the movement of the body 20 with respect to the frame 13. The constraint element 21 is at least partially housed at a respective opportunely provided guide 15 and is engaged to the body 20. As illustrated in the accompanying drawings, the constraint element 21 is engaged to the body 20 at an upper portion of the body 20. The constraint element 21 is configured for operating between a rest condition in which it does not constrain the movement of the body 20, and therefore the thrust element 19 therein housed, with respect to the frame 13, and a constraint condition in which it constrains the movement of the body 10, and therefore of the thrust element 19 therein housed, with respect to the frame 13. FIGS. 3 and 4 illustrate the rest condition of the constraint element 21 wherein a movement of the body 20 is allowed; given that the movement of the body 20 is allowed, also the movement of the belt tensioner terminal 17 with respect to the belt 11 is allowed in such rest condition and therefore, the thrust of the belt tensioner terminal 17 on the belt 11 may be adjusted in the rest condition of the constraint element 21. FIGS. 5 and 6 illustrate the constraint condition of the constraint element 21 wherein the body 20, and therefore the thrust element 19, is constrained in a given position with respect to the frame 13; given that the position of the body 20 is constrained in such constraint condition, also the position of the belt tensioner terminal 17 is constrained with respect to the belt 11. Therefore, it is not possible to adjust the thrust of the belt tensioner terminal 17 on the belt 11 in the constraint condition of the constraint element 21 except for the automatic adjustment made by the elastic thrust of the thrust element 19 that may automatically take place due to the elastic force of the thrust element 19 following a slight slackening of the belt 11. The constraint element 21 is integral with the body 20 and the frame 13 in the constraint condition. The constraint element 21 may be of threaded type. In the embodiment shown in the accompanying drawings, two constraint elements 21 are illustrated, each of which is at least partially housed in a respective guide 15. The guides 15 for the constraint elements 21 allow conveniently directing the respective constraint elements 21, slidingly housed therein, in translation close to or far from the belt 11. The embodiment shown in the accompanying drawings illustrates two constraint elements in the form of two screws 21 (see FIG. 5 in particular); it is understood that alternative constraint elements 21 with respect to the screws may be provided in further embodiments.

The device 12 further comprises an intermediate portion 22 connecting the belt tensioner terminal 17 and the body 20. The intermediate portion 22 is at least partially hollow and at least partially houses the belt tensioner terminal 17. As illustrated in the accompanying drawings, the belt tensioner terminal 17 is housed at the intermediate portion 22 so that, in assembled conditions of the belt tensioner device 12 wherein it is close to the belt 11, an end 17a of the belt tensioner terminal 17 facing the belt 11 protrudes with respect to the intermediate portion 22. Providing for the end 17a of the belt tensioner terminal 17 facing the belt 11 to protrude with respect to the intermediate portion 22 allows the belt tensioner terminal 17 to enter into contact with the belt 11 for tensioning 12 the belt 11 itself. The contact surface of the belt tensioner terminal 17 described above preferably is defined at the end 17a of the belt tensioner terminal 17 for allowing contact between belt tensioner terminal 17 and belt 11. The body 20 and the intermediate portion 22 may translate with respect to the frame 13 in the rest condition of the constraint element 21. The body 20 is integral with the frame 13 and the body 22 may translate with respect to the frame 13 subsequent to the thrust exerted by the thrust element 19 on the belt tensioner terminal 17 in the constraint condition of the constraint element 21. The intermediate portion 22 may be "C-" or "U-" shaped. The embodiment shown in the accompanying drawings illustrates an intermediate portion in the shape of a bracket 22 that houses the pair of ball bearings 17 and supports them by means of a pin 18 that is engaged to the bracket 22. In certain variants, the intermediate portion 22 may have any alternative shape to the bracket that is adapted to form a cavity intended to house the belt tensioner terminal 17.

The device 12 further comprises an adjustment portion 23. As illustrated in the accompanying drawings, the adjustment portion may be engaged to the body 20 in a sliding way. The adjustment portion 23 is operatively associated with the thrust element 19. The adjustment portion 23 may make small movements with respect to the body 20 under the action of the thrust element 19. In particular, the adjustment portion 23 may translate away from the belt 11 due to a partial elastic springback of the thrust element 19 in the operating condition of the constraint elements 21. Partial elastic springback means a limited elastic springback because the thrust element 19 cannot carry out a complete elastic springback due to the engagement methods of the thrust element 19 to the components of the device 12 described in the present description and to the need to thrust on the belt tensioner terminal 17 with a given elastic force to pull tight the belt 11. The adjustment portion 23 preferably is integral with the guide element 27, even more preferably the adjustment portion corresponds to the guide element 27. In the embodiment shown in the accompanying drawings, the adjustment portion 23 is illustrated in the form of a screw stud that is pressure fastened to the intermediate portion 22 and that slidingly threads the thrust element 19 and the body 20. Moreover, a self-locking nut configured to prevent the thrust element 19 from causing the adjustment portion 23 and the belt tensioner terminal 17 to be completely removed from the body 20 is screwed at the free end of the screw stud, opposite to the intermediate portion 22. It is however understood that there may be provided an alternative adjustment portion 23 to the screw stud and self-locking nut assembly. For example, the adjustment portion 23 may comprise a screw fastened to the intermediate portion 22; the end of the screw is provided with a head configured to prevent the thrust element 19 from causing the adjustment portion 23 and the belt tensioner terminal 17 to be completely removed from the body 20.

The device 12 further comprises an adjustment element 24, which may be engaged in a removable way to the adjustment portion 23 for adjusting the tension of the belt 11 in operating conditions of the device 12. The adjustment element 24 is configured for operating on the thrust element 19 so as to adjust a thrust intensity that the thrust element 19 exerts on the belt tensioner terminal 17, adjusting the position of the whole device 12 with respect to the belt 11. As illustrated in FIGS. 4 and 5, the adjustment element 24 is engaged to the frame 13 at a through guide seat 16a during the tensioning of the belt 11 (thrust adjustment step). The adjustment element 24 may comprise an operative portion 24a at which it is possible to operate, for example by means of a tool such as a screwdriver, on the adjustment element 24 for tensioning the belt 11. The operative portion 24a may have an overall dimension in section which is greater than a free passage area of the through seat 16a so as to enter into contact on the side wall 13b in which the seat 16a is made (see FIG. 5), in a condition of maximum penetration of the adjustment element 24 into the seat 16a. The adjustment element 24 may further comprise a stem 24b connected to the operative portion 24a and configured for entering into contact with the adjustment portion 23 (see FIG. 4 and FIG. 5). In the embodiment shown in the accompanying drawings, an adjustment screw 24 provided with a head 24a and a stem 24b connected to the head 24a is provided as adjustment element; it is however understood that a different adjustment element 24 from a screw may be provided in alternative embodiments.

Below is a brief description of the operation of the device 12 shown in the embodiment illustrated in the accompanying drawings, which shall be more apparent in light of the method for tensioning a belt 11 of a video camera assembly 1 that is described in detail in the continuation of the present description. The adjustment element 24 operates at the adjustment portion 23 for adjusting the tension of the belt 11 (see FIG. 4, for example) in operating conditions of the device 12, that is in conditions of adjusting the tension of the belt 11. It is housed at a guide seat 16a made on a side wall 13b of the frame 13 in operating conditions of the adjustment element 24; in the embodiment shown in the accompanying drawings, the seat is depicted as a through hole 16a. The guide seat 16a is arranged frontally with respect to the adjustment portion 23 and is substantially coaxial with the adjustment portion 23. The seat 16a cooperates with the adjustment element 24 to direct it towards the adjustment portion 23 and serves substantially as support for the stem 24b of the adjustment element 24. In an initial step of adjusting the tension of the belt 11, the constraint elements 21 are in the rest condition and therefore do not constrain the translation of the body 20 with respect to the frame 13 (see FIG. 3). The adjustment element 24 operates on the adjustment portion 23, determining the translation thereof in direction of the belt 11. As is apparent to a person skilled in the art, the translation of the adjustment portion 23 involves the translation of the whole device 12 towards the belt 11. The translation of the adjustment portion 23 is carried out by thrusting the adjustment element 24 against the adjustment portion 23 towards the belt 11. The translation of the adjustment portion 23 determines the translation of the body 20, of the intermediate portion, of the belt tensioner terminal and therefore of the thrust element 19 therein housed. The translation of the body 20 is guided by the guide 14 slidingly housing the sliding portion 20a and determines the translation of the intermediate portion 22, therefore of the belt tensioner terminal 17 therein housed. The belt tensioner terminal 17 translates close to the belt 11 and enters into contact therewith at the contact surface, pulling tight the belt 11. Also the constraint elements 21 translate integrally with the body 20, sliding in the respective guides 15, given that they are in the rest condition. The thrust element 19 is not compressed in operating conditions of the adjustment element 24.

In essence, in the rest condition of the constraint elements 21, the adjustment portion 23, the body 20 (therefore the thrust element 19 therein housed), the intermediate portion 22 (therefore the belt tensioner terminal 17) substantially have a single level of freedom given by a translation with respect to the frame 13. As illustrated in the embodiment shown in the accompanying drawings, the translation allowed in the rest condition of the constraint elements 21 is carried out along the operative direction of the adjustment element 24. Such operative direction may be orthogonal to the development direction of the constraint elements 21 and may substantially coincide with the main development direction of the adjustment portion 23. As is apparent to a person skilled in the art, a maximum translation is defined by the length of the stem 24b of the adjustment element. Advantageously, the length of the stem 24b may be determined by exerting a tensioning force of the belt within a desired range of values to ensure optimal performance of the belt 11.

Other embodiments (not illustrated in the accompanying drawings) may provide reciprocal alternative arrangements of the operative and development directions of the components of the device 12.

The action of the adjustment element 24, and therefore the aforesaid translation of the components of the device 12, is interrupted when a desired positioning of the belt tensioner terminal 17 with respect to the frame 13 is reached, substantially corresponding to a desired tension of the belt 11 (and vice versa), less a partial elastic springback of the thrust element 19 that is described below. The partial elastic springback of the thrust element 19 determines an optimal positioning of the belt tensioner terminal 17 capable of tightening the belt 11 in a desired way. At this point, the position of the body 20 is constrained with respect to the frame 13 by means of action on the constraint elements 21. In order to prevent the translation of the body 20, the constraint elements 21 are tightened. In the embodiment shown in the accompanying drawings in which screws are provided as constraint elements 21, the screws 21 are tightened, constraining the position thereof with respect to the frame 13 to determine the translation of the screws 21 from the rest condition to the constraint condition.

At this point, the adjustment element 24 is disengaged from the adjustment portion 23. The adjustment element 24 therefore may be put back at a further storing seat 16b (see FIG. 5). As illustrated in the embodiment shown in the accompanying drawings, such seat may be provided a through hole 16b; FIG. 6 depicts the adjustment element 24 housed, following the use thereof for adjusting the tension of the belt 11, at the through hole 16b made on a side wall 13b of the frame 13. The through hole 16b preferably is threaded. It is understood that in other embodiments not shown in the accompanying drawings, an alternative storing seat 16b to the through hole may be provided, such as a seat having an inlet opening, a bottom and a side wall connecting the inlet opening and the bottom. In such embodiment (not illustrated in the accompanying drawings), the bottom constitutes a limit position abutment for the stem 24b of the adjustment element 24, which is inserted in the seat at the inlet opening and is guided in insertion into the seat 16b by the shape of the side wall.

The thrust element 19 starts functioning, that is to say it exerts its elastic thrust in order to adjust the position of the belt tensioner terminal 17 with respect to the belt 11 only when the adjustment element 24 is operatively disconnected from the thrust element 19. The thrust element 19 therefore is configured for being elastically deformed in a condition wherein the adjustment element 24 is operatively disconnected from the thrust element 19. At the disengagement of the adjustment element 24, the thrust element 19 undergoes a partial elastic springback due to the reaction between belt 11 and belt tensioner terminal 17 (subsequent to the action of the belt tensioner terminal 17 on the belt 11) that determines a contained translation of the adjustment portion 23 away from the body 20. In other words, as it is apparent to a person skilled in the art, the belt 11 exerts a reaction on the belt tensioner terminal 17 capable of compressing the thrust element 19, causing the free end of the adjustment element 23—and of the self-locking nut mounted thereon—to move away with respect to the body 20. Such translation determines the formation of a gap 25 between the adjustment portion 23, in particular the free end thereof, and the body 20. The gap 25, which may be in the order of mm, allows a contained oscillation of the adjustment portion 23 with respect to the body 20 adapted to deal with the vibrations, the stresses or the strains that the belt 11 transmits, in operating conditions, to the device 12 by means of the belt tensioner terminal 17. The gap 25 may for example, be adapted to deal with the vibrations, the stresses or the strains by absorbing, damping or dissipating such vibrations, stresses and strains by means of oscillation of the adjustment portion 23 and of the elastic thrust element 19. The gap 25 allows keeping substantially constant the tension of the belt 11 by automatically compensating for a possible relaxation—that is a loss of tension—that occurs during operation. This is possible because the gap 25 provides a clearance adapted to determine an automatic adjustment of the thrust of the thrust element 19 on the belt tensioner terminal 17 and therefore allows substantially keeping constant the tension of the belt 11. In the example considered, the gap 25 allows the thrust element 19 (that is, the expansion spring) to expand proportionately to the relaxation of the belt 11. As illustrated in FIG. 6, the gap 25 may be defined between a free end of the adjustment portion 23 and a wall of the body 20. In particular, the gap 25 is defined between preferably substantially parallel respective facing surfaces of a terminal element (head) of the adjustment portion 23 and of the body 20.

The device 12 for tensioning a belt of a video camera assembly 1 of the type described above may be used for carrying out a first tensioning of the belt 11, for example in assembly step of the video camera assembly 1, or for adjusting the tension of a belt 11, for example following a first tensioning of the belt 11, that is to say following a first tightening of the constraint elements 21. The adjustment of the tension of the belt 11 could be required after a use of the video camera assembly 1, for example to deal with a possible slackening of the belt 11.

The present invention also relates to a method for tensioning a belt 11 of a video camera assembly 1.

The method for tensioning a belt 11 of a video camera assembly 1 envisages providing a belt 11 of a video camera assembly 1. The method also provides thrusting, by means of a thrust element 19, a belt tensioner terminal 17 against the belt 11. The thrust step preferably is carried out by means of a thrust element of elastic type, like the spring 19 illustrated in the accompanying drawings. As detailed above, an alternative elastic thrust element 19 may be used with respect to a spring. The thrust step allows tensioning the belt 11.

The method also provides adjusting a thrust intensity that the belt tensioner terminal 17 exerts on the belt 11. The thrust intensity adjustment step makes use of an adjustment element 24 operatively connected to the thrust element 19 through the adjustment portion 23. The thrust adjustment step on the belt 11 by means of an adjustment element 24 operatively connected to the thrust element determines the movement of a body 20 housing the thrust element 19 and the movement of the belt tensioner terminal 17, which substantially translate integrally with each other. The movement of the body 20 may be carried out according to the methods described above and determines the substantially integral movement also of the intermediate portion 22. The thrust adjustment step on the belt 11 provides determining a desired tension of the belt 11 by modulating the position of the belt tensioner terminal 17 by means of the adjustment element 24. According to what described above, the thrust adjustment step on the belt 11 preferably is carried out by operating with the adjustment element 24 at the adjustment portion 23. The thrust element 19 is not compressed in operating conditions of the adjustment element 24.

The method then comprises constraining the belt tensioner terminal 17 in a desired position. The desired position of the belt tensioner terminal 17 may be for example, defined with respect to the frame 13 and substantially corresponds to a desired tension of the belt 11 (and vice versa), less a partial elastic springback of the thrust element 19. The partial elastic springback of the thrust element 19 therefore determines an optimal positioning of the belt tensioner terminal 17 capable of pulling tight the belt 11 in a desired way. In essence, the desired position of the belt tensioner terminal 17 corresponds to a desired tension of the belt 11 (and vice versa). The constraint of the belt tensioner terminal 17 in a desired position may be carried out by means of constraint elements 21. The constraint elements 21 may be of the type described above; the transition of the constraint elements 21 from the rest condition to the constraint condition may be carried out by tightening the constraint elements 21 according to what described above. The step of constraining the belt tensioner terminal 17 in a desired position is carried out after determining a desired tension of the belt 11. The step of constraining the belt tensioner terminal 17 in a desired position provides constraining the body 20 to the frame 13 by means of the constraint elements 21 and therefore, of constraining the position of the thrust element 19 with respect to the frame 13, with the exception of the partial elastic springback of the thrust element 19, which is detailed below in terms of method and which, as described above, determines contained movements of the adjustment portion 23 of the belt 11 in operating conditions.

Following the constraint step described above, the method also comprises a step that provides operatively disconnecting the adjustment element 24 from the thrust element 19. Such step provides disengaging the adjustment element 24 from the adjustment portion 23. By disengaging the adjustment element 24 from the adjustment portion 23, the thrust element 19 starts operatively functioning, that is to say it exerts its elastic thrust in order to adjust the position of the belt tensioner terminal 17 with respect to the belt 11, corresponding to a desired tension of the belt 11. The thrust element 19 starts functioning by being elastically deformed. The disengagement of the adjustment element 24 from the adjustment portion 23 determines the formation of a gap 25 between the adjustment portion 23 and the body 20 housing the thrust element 19. The gap 25 is formed by partial elastic springback of the thrust element 11, which determines a contained movement of the adjustment portion 23 away from the body 20 and from the belt 11. According to that described above, the gap 25, which may be in the order of mm, allows a contained oscillation of the adjustment portion 23 with respect to the body 20 adapted to deal with the vibrations, the stresses or the strains that the belt 11 transmits to the device 12 by means of the belt tensioner terminal 17, in operating conditions of the belt 11. The gap 25 may for example, be adapted to deal with the vibrations, the stresses or the strains by absorbing, damping or dissipating such vibrations, stresses and strains by means of oscillation of the adjustment portion 23 and of the elastic thrust element 19. According to that above, the gap 25 allows substantially keeping constant the tension of the belt 11. As illustrated in FIG. 6, the gap 25 may be defined between the adjustment portion 23 and a wall of the body 20. In particular, the gap 25 is defined between preferably substantially parallel respective facing surfaces of the adjustment portion 23 and of the body 20.

The method may be implemented by using a device 12 for tensioning a belt 11 of a video camera assembly 1 of the type described above and therefore, in addition to the step of providing a belt 11, may comprise a step of providing a device 12 for tensioning a belt of a video camera assembly 1 of the type described above. In one embodiment, the step of providing the belt 11 may comprise preparing a video camera assembly 1 of the type described above, comprising at least one belt 11 and a device 12 for tensioning a belt 11 of a video camera assembly 1.

The method may be implemented for carrying out a first tensioning of the belt 11, for example in assembly step of the video camera assembly 1, or for adjusting the tension of a belt 11, for example following a first tensioning of the belt 11, that is to say, following a first tightening of the constraint elements 21. The adjustment of the tension of the belt 11 could be required after a use of the video camera assembly 1, for example to deal with a possible slackening of the belt 11.

Should the method be implemented for carrying out a first tensioning of the belt 11, the step of thrusting a belt tensioner terminal 17, by means of a thrust element 19, against the belt 11 for tensioning the belt 11 is preceded by a step that provides putting a belt tensioner terminal 17 in contact with the belt 11. The contact between belt tensioner terminal 17 and belt 11 may be achieved at a contact surface of the belt tensioner terminal 17.

Should the method be implemented for adjusting the tension of a belt 11, the method provides a step of releasing the belt tensioner terminal 17 for allowing an adjustment of the tension of the belt 11. Such step may be provided following the step of providing the belt 11 and prior to the step that provides thrusting a belt tensioner terminal 17, by means of a thrust element 19, against the belt 11.

In conclusion, any materials and also any contingent shapes and sizes may be used, depending on the specific implementation needs, without departing from the scope of protection of the following claims.

The invention claimed is:

1. A device for tensioning a belt of a video camera assembly, the device comprising:
   a belt tensioner terminal configured for operating in contact with the belt for tensioning the belt,
   a thrust element of elastic type operating on the belt tensioner terminal for thrusting the belt tensioner terminal against the belt,
   an adjustment element configured for determining an adjustable positioning of the belt tensioner terminal with respect to the belt,
   at least one constraint element configured for operating between a rest condition wherein it does not constrain the positioning of the belt tensioner terminal and a constraint condition wherein it constrains in position the belt tensioner terminal, wherein the adjustment element is configured for being connected to the thrust element in a removable way, and wherein the thrust element and the adjustment element share a same operative direction, said at least one constraint element operating or developing along a direction which is orthogonal to said operative direction of the thrust element and of the adjustment element.

2. The device according to claim 1, further comprising a body housing the thrust element, a movement of the body adjusting the thrust by which the belt tensioner terminal thrusts on the belt, wherein:
said adjustment element is configured for moving the body so as to adjust a thrust intensity that the belt tensioner terminal exerts on the belt, and
said at least one constraint element is engaged to the body, said at least one constraint element allowing the movement of the body in the rest condition and determining a stable positioning of the body in the constraint condition, preventing the movement thereof.

3. The device according to claim 2, further comprising a frame, said at least one constraint element being engaged to said frame, in the rest condition said at least one constraint element allowing the movement of the body with respect to the frame and thus not constraining a positioning of the thrust element, in the constraint condition said at least one constraint element fastening the body in position with respect to the frame and thus determining a stable positioning of the thrust element.

4. The device according to claim 3, wherein the frame has at least one guide for said at least one constraint element, the guide being configured for allowing, in the rest condition of said at least one constraint element, a movement of said at least one constraint element, said at least one constraint element being at least partially housed at said guide.

5. The device according to claim 3, wherein the frame has a portion developing frontally with respect to said body, said portion having at least one seat, in operating conditions the adjustment element being housed at said seat, optionally wherein the seat comprises a through hole substantially coaxial with respect to an operative direction of the adjustment element.

6. The device according to claim 2, further comprising an adjustment portion engaged to the body, the thrust element being engaged to the adjustment portion, the adjustment element being configured for being engaged in a removable way to the adjustment portion for operating on the thrust element, wherein the thrust element is configured for forming, following the disengagement of the adjustment element from the adjustment portion, a gap between a free end of the adjustment portion and the body by partial elastic springback of the thrust element.

7. The device according to claim 5, wherein the seat is arranged coaxial with the adjustment portion and is configured for cooperating with the adjustment element for directing it towards the adjustment portion.

8. The device according to claim 7, wherein the adjustment element comprises a stem configured for entering in contact with the adjustment portion, and wherein the seat is suitable for receiving in a through way the stem and acting as a support for the stem of the adjustment element.

9. The device according to claim 8, wherein the adjustment element comprises an operative portion having an overall dimension in section which is greater than a free passage area of the seat so as to enter into contact with the portion of the frame, in a condition of maximum penetration of the adjustment element into the seat.

10. The device according to claim 8, wherein the adjustment element comprises one of a bolt, a screw and a nail.

11. A video camera assembly comprising:
a video camera housing body,
a video camera housed inside the video camera housing body,
a motor,
a belt coupled to the motor and configured for transferring rotary motion,
a device for tensioning the belt,
wherein the device for tensioning the belt comprises:
a belt tensioner terminal configured for operating in contact with the belt for tensioning the belt,
a thrust element of elastic type operating on the belt tensioner terminal for thrusting the belt tensioner terminal against the belt,
an adjustment element configured for determining an adjustable positioning of the belt tensioner terminal with respect to the belt,
at least one constraint element configured for operating between a rest condition wherein it does not constrain the positioning of the belt tensioner terminal and a constraint condition wherein it constrains in position the belt tensioner terminal,
wherein the adjustment element is configured for being connected to the thrust element in a removable way,
and wherein the thrust element and the adjustment element share a same operative direction, said at least one constraint element operating or developing along a direction which is orthogonal to said operative direction of the thrust element and of the adjustment element.

12. The video camera assembly according to claim 11, further comprising a box-like body housing the device for tensioning the belt, the video camera housing body being rotatably engaged to a first portion of the box-like body, wherein the belt is a power transmission belt configured for allowing a rotation of the first portion and of the video camera housing body with respect to a second portion of the box-like body in at least an operating condition of the video camera assembly.

13. A method for tensioning a belt of a video camera assembly comprising at least the following steps:
providing a belt of a video camera assembly according to claim 11,
thrusting, by means of a thrust element of elastic type, a belt tensioner terminal against the belt for tensioning the belt, the thrust element and the adjustment element share a same operative direction,
adjusting a thrust intensity that the belt tensioner terminal exerts on the belt by means of an adjustment element,
constraining the belt tensioner terminal in a desired position by means of at least one constraint element operating or developing along a direction which is orthogonal to said operative direction of the thrust element and of the adjustment element, the desired position of the belt tensioner terminal corresponding to a desired tension of the belt,
disconnecting the adjustment element from the thrust element.

14. The method according to claim 13, wherein adjusting a thrust intensity that the belt tensioner terminal exerts on the belt comprises moving the belt tensioner terminal and moving a body housing the thrust element.

15. The method according to claim 13, wherein constraining the belt tensioner terminal in a desired position comprises constraining a position of the thrust element and/or of the body, for example with respect to a frame.

16. The method according to claim 13, further comprising a step of releasing the belt tensioner terminal in order to allow an adjustment of the tension of the belt.

17. The method according to claim 13, wherein:

adjusting a thrust intensity that the belt tensioner terminal exerts on the belt comprises operating with said adjustment element at an adjustment portion, operatively disconnecting the adjustment element from the thrust element comprises disengaging the adjustment element from the adjustment portion, the method further comprising a step of forming a gap between a free end of said adjustment portion and a body housing the thrust element by partial elastic springback of the thrust element, the step of forming the gap being subsequent to the step of disengaging the adjustment element from the adjustment portion.

18. The device according to claim 2, further comprising a frame, said at least one constraint element being engaged to said frame, in the rest condition said at least one constraint element allowing the movement of the body with respect to the frame and thus not constraining a positioning of the thrust element, in the constraint condition said at least one constraint element fastening the body in position with respect to the frame and thus determining a stable positioning of the thrust element, wherein the frame has at least one guide for said at least one constraint element, the guide being configured for allowing, in the rest condition of said at least one constraint element, a movement of said at least one constraint element, said at least one constraint element being at least partially housed at said guide, and wherein the frame has a portion developing frontally with respect to said body, said portion having at least one seat, in operating conditions the adjustment element being housed at said seat, optionally wherein the seat comprises a through hole substantially coaxial with respect to an operative direction of the adjustment element, and wherein the device further comprises an adjustment portion engaged to the body, the thrust element being engaged to the adjustment portion, the adjustment element being configured for being engaged in a removable way to the adjustment portion for operating on the thrust element, wherein the thrust element is configured for forming, following the disengagement of the adjustment element from the adjustment portion, a gap between a free end of the adjustment portion and the body by partial elastic springback of the thrust element.

* * * * *